(12) United States Patent
Boere et al.

(10) Patent No.: US 10,813,733 B2
(45) Date of Patent: Oct. 27, 2020

(54) DRIVETRAIN ASSEMBLY FOR A PERSONAL CARE DEVICE

(71) Applicant: KONINKLIJKE PHILIPS N.V., Eindhoven (NL)

(72) Inventors: Stijn Willem Boere, Eindhoven (NL); Hermanus Mathias Joannes Rene Soemers, Mierlo (NL); Jan Willem Bruggers, Horst (NL); Aditya Mehendale, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/332,241

(22) PCT Filed: Sep. 4, 2017

(86) PCT No.: PCT/EP2017/072065
§ 371 (c)(1),
(2) Date: Mar. 11, 2019

(87) PCT Pub. No.: WO2018/046429
PCT Pub. Date: Mar. 15, 2018

(65) Prior Publication Data
US 2019/0269488 A1 Sep. 5, 2019

Related U.S. Application Data

(60) Provisional application No. 62/393,310, filed on Sep. 12, 2016.

(51) Int. Cl.
*A61C 17/02* (2006.01)
*A61C 17/16* (2006.01)
(Continued)

(52) U.S. Cl.
CPC .......... *A61C 17/3472* (2013.01); *A46B 13/02* (2013.01); *A61C 1/18* (2013.01);
(Continued)

(58) Field of Classification Search
CPC . A61C 17/0202; A61C 17/16; A61C 17/3472; A61C 17/3481; A61C 15/047; A46B 13/02
See application file for complete search history.

(56) References Cited

U.S. PATENT DOCUMENTS 3,538,359 A 11/1970 Baroski
6,859,968 B2 * 3/2005 Miller .................... A61C 17/22
15/22.1
(Continued)

FOREIGN PATENT DOCUMENTS

EP 2410641 A1 1/2012
EP 2790309 A1 10/2014
WO 2010001197 A1 1/2010

*Primary Examiner* — Randall E Chin

(57) ABSTRACT

A drivetrain assembly (100) for a personal care device (10), the drivetrain assembly including a primary resonator (110); a secondary resonator (140) configured to reduce vibrations transmitted from the motor to a body (12) of the personal care device; a fixed point (130) positioned between the primary resonator and the secondary resonator; a first spring member (120) connected at a first end to the primary resonator and at a second end to the fixed point; a second spring member (150) connected at a first end to the secondary resonator and at a second end to the fixed point; a coupling spring (160) connected at a first end to the primary resonator and at a second end to the secondary resonator; and an actuator (170) configured to exert force on at least one of the primary resonator and the secondary resonator.

11 Claims, 4 Drawing Sheets

(51) Int. Cl.

| | |
|---|---|
| *A61C 17/34* | (2006.01) |
| *A46B 13/02* | (2006.01) |
| *A61C 15/04* | (2006.01) |
| *F16F 1/02* | (2006.01) |
| *F16F 3/02* | (2006.01) |
| *A61C 1/18* | (2006.01) |
| *F16F 15/22* | (2006.01) |

(52) U.S. Cl.
CPC ........ *A61C 15/047* (2013.01); *A61C 17/0202* (2013.01); *A61C 17/16* (2013.01); *A61C 17/3445* (2013.01); *A61C 17/3481* (2013.01); *F16F 1/025* (2013.01); *F16F 3/023* (2013.01); *A61C 17/3418* (2013.01); *F16F 15/22* (2013.01)

(56) References Cited

U.S. PATENT DOCUMENTS

| | | | |
|---|---|---|---|
| 9,301,822 B2 * | 4/2016 | Grez | ........................ F16F 7/104 |
| 2004/0000016 A1 | 1/2004 | Miller et al. | |
| 2006/0175909 A1 | 8/2006 | Kraus | |
| 2009/0320220 A1 | 12/2009 | Takahashi et al. | |
| 2010/0072684 A1 | 3/2010 | De Jong et al. | |
| 2013/0025080 A1 | 1/2013 | Jungnickel et al. | |
| 2014/0015346 A1 | 1/2014 | Schober et al. | |
| 2014/0060975 A1 | 3/2014 | Kloster et al. | |
| 2014/0259473 A1 | 9/2014 | Bax et al. | |

* cited by examiner

DRIVETRAIN ASSEMBLY FOR A PERSONAL CARE DEVICE

CROSS-REFERENCE TO PRIOR APPLICATIONS

This application is the U.S. National Phase application under 35 U.S.C. § 371 of International Application No. PCT/EP2017/072065 filed on Sep. 4, 2017, which claims the benefit of U.S. Provisional Patent Application No. 62/393,310, filed on Sep. 12, 2016. These applications are hereby incorporated by reference herein.

FIELD OF THE INVENTION

The present disclosure is directed generally to a personal care device drivetrain configuration comprising a force balanced mechanical resonator.

BACKGROUND

Proper tooth brushing, including length and coverage of brushing, helps ensure long-term dental health. Many dental problems are experienced by individuals who either do not regularly brush their teeth or who do so inadequately, especially in a particular area or region of the oral cavity. Among individuals who do brush regularly, improper brushing habits can result in poor coverage of brushing and thus surfaces that are not adequately cleaned during a cleaning session, even when a standard brushing regimen is followed. Electric cleaning devices, such as electric toothbrushes, have been shown to greatly increase the efficacy of a cleaning session.

These electric cleaning devices, including power toothbrushes, shavers, skin cleaners, and similar devices, have motor that engages a drivetrain in order to drive a brushhead in an oscillating, reciprocating, or other pattern. The devices also include a resonator, which is a component of the drivetrain that converts the oscillatory force of the motor into rotational movement. The actuator force excites the resonance of the system, which ensures high rotational amplitude at low input power. Some devices comprise a mechanical resonator, which includes a mechanical spring. Together with the inertia of the system, the mechanical spring defines the natural frequency of the system. Other devices comprise a magnetic resonator, which includes a magnetic spring. The magnetic spring attracts iron in the actuator, and the magnitude of attraction is related to the distance between the magnet and the iron, creating a magnetic equivalent to a mechanical spring. Together with the driven inertia, the magnetic spring defines the natural frequency of the system.

Resonators can be force balanced or force unbalanced. In a force unbalanced resonator, the forces associated with the deflection of the springs are transferred to the handle, creating unwanted vibrations. In a force balanced design, the main spring forces are balanced by a secondary spring creating equal but opposite forces. Therefore, no reaction forces are transferred from the resonator to the handle.

For example, some force balanced mechanical resonators may be nodally mounted, which should eliminate the transfer of forces from the resonator to the handle. This requires suspension of the nodal point to the housing such that the resonance frequency and eigenmode of the system are according to the dynamic principles of a force balanced resonator, which in turns that the nodal point remain compliant, and that there be a rigid fixation of portions of the resonator to the housing. In practice, this results in stress and failure of the resonator due to high local stresses at the nodal point, unwanted vibrations or failure if the point of fixation is not exactly at the nodal point of the eigenmode, and other mechanical stress and/or failures.

Accordingly, there is a need for personal care devices with drivetrains comprising a force balanced mechanical resonator that minimizes mechanical stress and failures.

SUMMARY OF THE INVENTION

The present disclosure is directed to inventive drivetrain assemblies comprising a force balanced mechanical resonator. Applied to an electric or power personal care device such as an electric toothbrush or shaver, the inventive systems provide a highly efficient drivetrain assembly that experiences less stress and fewer failures. The drivetrain assembly comprises a load mass such as a brush head connected to a fixed point by a spring, a balance mass connected to the fixed point by a second spring, a coupling spring connecting the load mass to the balance mass, and an actuator that exerts force on the load mass, the balance mass, or both the load mass and the balance mass. The embodiments described herein relate to a rotational force exerted on the drivetrain, and/or to a translational force exerted on the drivetrain.

Generally in one aspect, a drivetrain assembly for a personal care device is provided. The drivetrain assembly includes: a primary resonator connected to a transmission configured to transmit vibrations generated by a motor to a head member; a secondary resonator configured to reduce vibrations transmitted from the motor to a housing of the personal care device; a fixed member positioned between the primary resonator and the secondary resonator; a first spring member connected at a first end to the primary resonator and at a second end to the fixed member; a second spring member connected at a first end to the secondary actuator and at a second end to the fixed member; a coupling spring connected at a first end to the primary resonator and at a second end to the secondary resonator; and a resonator configured to exert force on at least one of the primary resonator and the secondary resonator.

According to an embodiment, the fixed member is fixed to the housing of the personal care device.

According to an embodiment, the force is a rotational force exerted on at least one of the primary resonator and the secondary resonator. According to another embodiment, the force is a translational force exerted on at least one of the primary resonator and the secondary resonator.

According to an embodiment, the resonator is configured to exert a first force on the primary resonator approximately 180° out of phase with a second force exerted on the secondary resonator.

According to an embodiment, the first spring member, the second spring member, and the coupling spring are V-shaped springs. According to an embodiment, the coupling spring is at least partially positioned within either the V-shaped first spring member or the V-shaped second spring member.

According to an aspect is a personal care device. The personal care device includes: a housing; a head member; and a drivetrain assembly having a primary resonator connected to a transmission configured to transmit vibrations generated by the motor to the head member; a secondary resonator configured to reduce vibrations transmitted from the motor to the housing; a fixed member positioned between the primary resonator and the secondary resonator; a first spring member connected at a first end to the primary resonator and at a second end to the fixed member; a second spring member connected at a first end to the secondary resonator and at a second end to the fixed member; a coupling spring connected at a first end to the primary resonator and at a second end to the secondary resonator; and an actuator configured to exert force on at least one of the primary resonator and the secondary resonator.

According to another aspect, a drivetrain assembly for a personal care device is provided. The drivetrain assembly includes: a load mass connected to a transmission configured to transmit vibrations generated by a motor to a head member; a balance mass configured to reduce vibrations transmitted from the motor to a housing of the personal care device; a first spring member connected at a first end to the load mass and at a second end to a fixed portion of the housing positioned between the load mass and the balance mass; a second spring member connected at a first end to the balance mass and at a second end to the fixed portion of the housing; a coupling spring connected at a first end to the load mass and at a second end to the balance mass; and an actuator configured to exert force on at least one of the load mass and the balance mass.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a device for a drivetrain assembly for an electric personal care device. More generally, Applicant has recognized and appreciated that it would be beneficial to provide a force balanced mechanical resonator that is more efficient and more resistant to stress. Accordingly, the systems described or otherwise envisioned herein provide a personal care device, such as an electric toothbrush, skin cleaner, or shaver, with a drivetrain assembly comprising a load mass such as a brush head connected to a fixed point by a spring, a balance mass connected to the fixed point by a second spring, a coupling spring connecting the load mass to the balance mass, and an actuator that exerts force on the load mass, the balance mass, or both the load mass and the balance mass.

A particular goal of utilization of the embodiments and implementations herein is to provide a drivetrain assembly for an personal care device such as, e.g., a Philips Sonicare™ electric toothbrush (manufactured by Koninklijke Philips Electronics, N.V.), although the assembly may be utilized with many other personal care devices, including flossers, skin cleaners, shavers, and many other devices.

Figure 1:
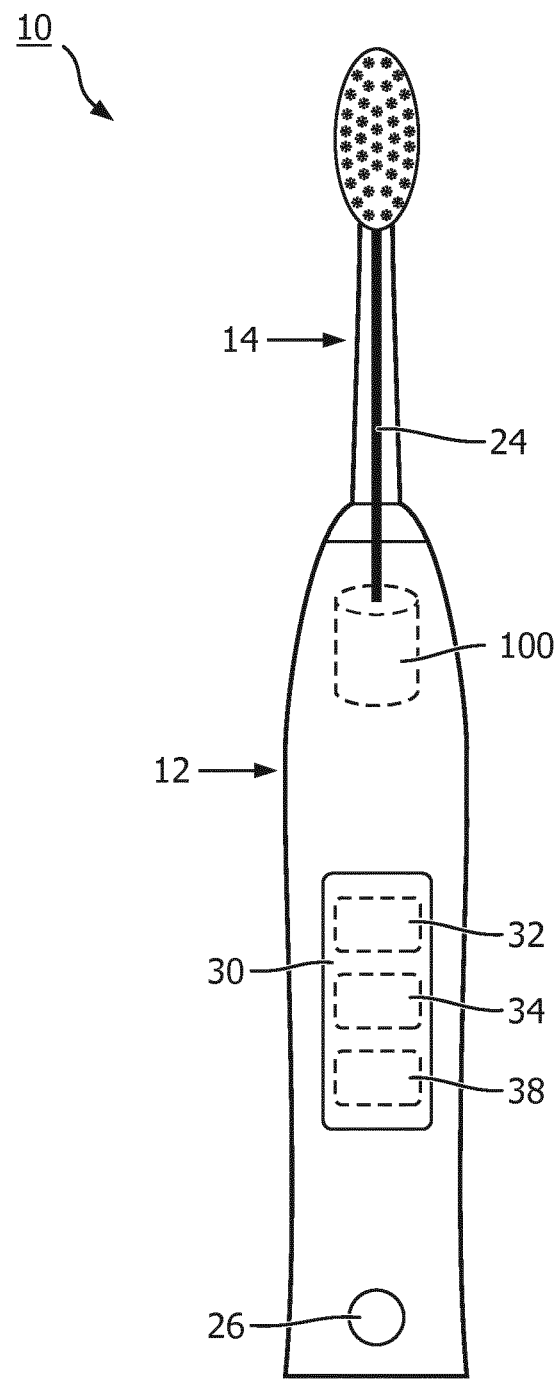
FIG. 1 is a schematic representation of a personal care device, in accordance with an embodiment.

Referring to FIG. 1, in one embodiment, personal care device 10 is provided that includes a body portion 12 and a brush head member 14. Brush head member 14 includes at its end remote from the body portion a brush head 16. The body portion 12 typically comprises a housing, at least a portion of which is hollow, to contain components of the personal care device.

Brush head member 14, is mounted so as to be able to move relative to the body portion 12. The movement can be any of a variety of different movements, including vibrations or rotation, among others.

The body portion 12 typically contains a drivetrain assembly 100 with a motor for generating movement, and a transmission component or drivetrain shaft 24, for transmitting the generated movements to brush head member 14. For example, drivetrain 100 comprises a motor or electromagnet(s) that generates movement of a drivetrain shaft 24, which is subsequently transmitted to the brush head member 14. Drivetrain 100 can include components such as a power supply, an oscillator, and one or more electromagnets, among other components. In this embodiment the power supply comprises one or more rechargeable batteries, not shown, which can, for example, be electrically charged in a charging holder in which personal care device 10 is placed when not in use. According to one embodiment, brush head member 14 is mounted to the drive train shaft 24 so as to be able to vibrate relative to body portion 12. The brush head member 14 can be fixedly mounted onto drive train shaft 24, or it may alternatively be detachably mounted so that brush head member 14 can be replaced with a different brush head member for different operating features, or when the bristles or another component of the brush head are worn out and require replacement.

The body portion 12 is further provided with a user input 26 to activate and de-activate drivetrain 100. The user input 26 allows a user to operate the personal care device 10, for example to turn the device on and off. The user input 26 may, for example, be a button, touch screen, or switch.

The body portion of the device also comprises a controller 30. Controller 30 may be formed of one or multiple modules, and is configured to operate the personal care device 10 in response to an input, such as input obtained via user input 26. Controller 30 can comprise, for example, a processor 32 and a memory 34, and can optionally include a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of personal care device 10. According to an embodiment, connectivity module 38 transmits collected sensor data, and can be any module, device, or means capable of transmitting a wired or wireless signal, including but not limited to a Wi-Fi, Bluetooth, near field communication, and/or cellular module.

Figure 2:
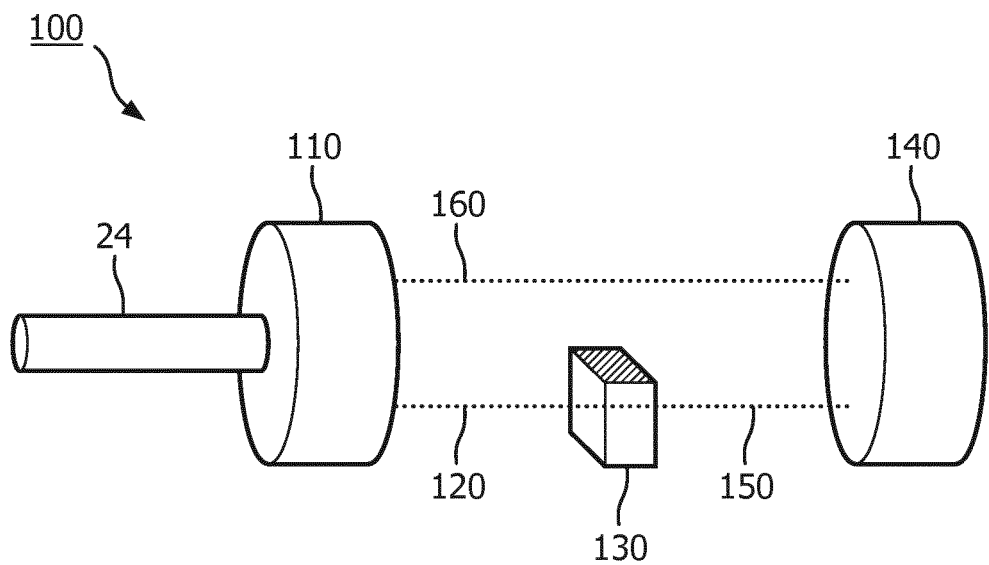
FIG. 2 is a schematic representation of a drivetrain assembly of a personal care device, in accordance with an embodiment.

Referring to FIG. 2, in one embodiment, is a drivetrain assembly 100 of a personal care device. The drivetrain assembly comprises a load mass 110, which can be brush head member 14 connected to a drive train shaft 24. The primary resonator, or load mass 110 is connected by a first spring member 120 to a fixed point 130 which is a portion of the frame or housing of the device, or fixedly connected to a portion of the frame or housing of the device. The drivetrain assembly 100 also comprises a secondary resonator, or balance mass 140. The balance mass 140 is connected by a second spring member 150 to the fixed point 130. The primary and secondary resonators, load mass 110 and balance mass 140 are also connected by a coupling spring 160. Although not shown in FIG. 2, the drivetrain assembly also comprises an actuator 190 that exerts a force on the primary resonator, or load mass 110, the secondary resonator or balance mass 140, or on both the primary resonator 110 and the secondary resonator 140. In this embodiment of the drivetrain assembly 100, the load mass 110 and the balance mass 140 act as two separate resonators, the primary and secondary resonators that are coupled via coupling spring 160.

According to an embodiment, the natural frequencies of the two separate resonators, the load mass 110 and the balance mass 140, should be equal when not coupled by coupling spring 160. As a result, the first resonance frequency will be characterized by the in-phase movement of both load mass 110 and balance mass 140. This resonance is located at a frequency equal to the square root of the stiffness of first spring member 120 divided by the load mass 110, or the square root of the stiffness of second spring member 150 divided by the balance mass 140. The second resonance frequency will be characterized by the out-of-phase movement of the load mass 110 and the balance mass 140. This resonance is shifted upwards in frequency with respect to the first resonance. The amount of frequency shift is determined by the stiffness of the coupling spring 160.

Figure 3:
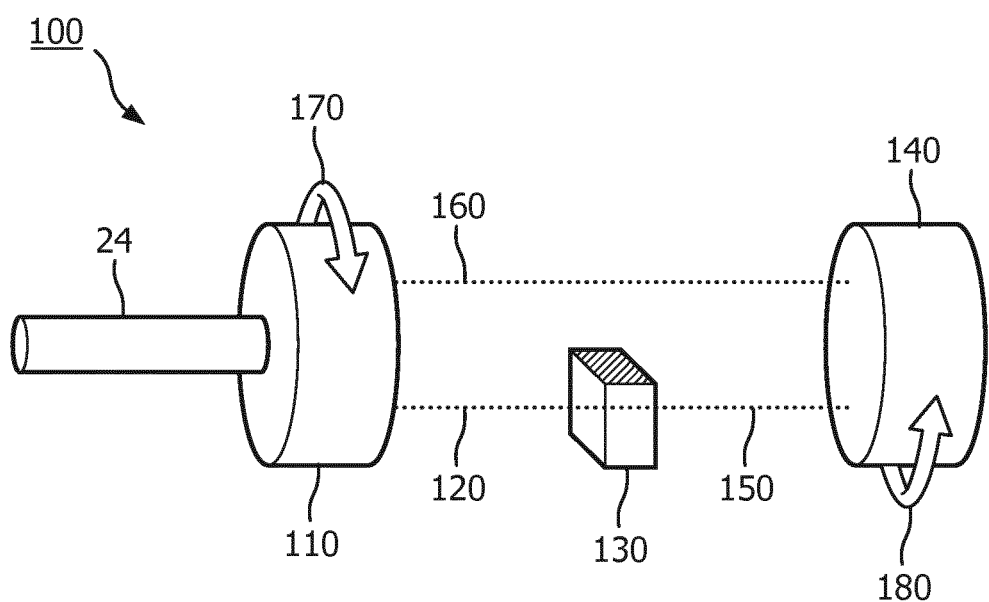
FIG. 3 is a schematic representation of a drivetrain assembly of a personal care device, in accordance with an embodiment.

Referring to FIG. 3, in one embodiment, is a drivetrain assembly 100 of a personal care device, for which the drivetrain is utilized to create an oscillatory rotation by applying a rotational force excitation. The rotational force can be applied in several different ways, including to just the load mass 110, to just the balance mass 140, or to both the load mass 110 and the balance mass 140. For example, torque 170 and/or 180 is applied to balance mass 140 and/or load mass 110. Although FIG. 3 depicts a specific direction of forces 170 and 180, it will be appreciated that these forces can be exerted in either a clockwise or a counterclockwise direction. Typically, when force is applied to both the load mass 110 and the balance mass 140, the force applied to one mass will be out of phase with the force applied to the other mass. When the frequency of the force excitation is matched to the second resonance frequency of the resonator, the load mass rotational amplitude is high while the net force from the resonator to the frame or housing is zero or nearly zero, which results in low vibrations of the handle.

It will be appreciated that while the embodiments described herein relate to a rotational force exerted on the drivetrain, the inventive drivetrain assembly encompasses embodiments in which the forces are exerted in a translational direction rather than a rotational direction.

According to an embodiment, the force excitation is exerted on the balance mass 140. In this embodiment, the coupling spring 160 transfers energy from the balance mass 140 to the load mass 110. The dynamic response of the system depends on the excitation frequency. According to an embodiment, the force excites the first natural frequency, the second natural frequency, or a combination of both.

According to another embodiment, the force excitation is exerted on the load mass 110. In this embodiment, the coupling spring 160 transfers energy from the load mass 110 to the balance mass 140. The dynamic response of the system depends on the excitation frequency. According to an embodiment, the force excites the first natural frequency, the second natural frequency, or a combination of both.

According to yet another embodiment, the force excitation is exerted on both the load mass 110 and the balance mass 140. The dynamic response of the system depends on the excitation frequency and relative phase between the two forces. When the forces are in-phase, only the first natural frequency can be excited. When the forces are out of phase, only the second natural frequency can be excited. Applying force excitation on both the load mass 110 and the balance mass 140 may be an optimal excitation strategy for certain embodiments of the personal care device, as it can efficiently excite the second natural frequency in the system when the excitation forces are out of phase, and the second natural frequency may be the preferred excitation frequency because the net force from the resonator to the frame or housing should be zero or nearly zero. Additionally, by applying out of phase forces to the load mass and the balance mass, the reaction force from the drive train itself to the body housing is also zero or nearly zero.

Although in a perfect system the coupling spring 160 could be removed if the load resonator natural frequency and the balance resonator natural frequency were exactly equal, in practice the load resonator and balance resonator are typically not exactly equal due to tolerances, external loading, and other factors. Furthermore, the system is highly sensitive to very small differences in natural frequencies, meaning that minor factors can have a very large impact. As a result, the coupling spring 160 is a vital component that synchronizes the movement between the balance mass and the load mass.

Figure 4:
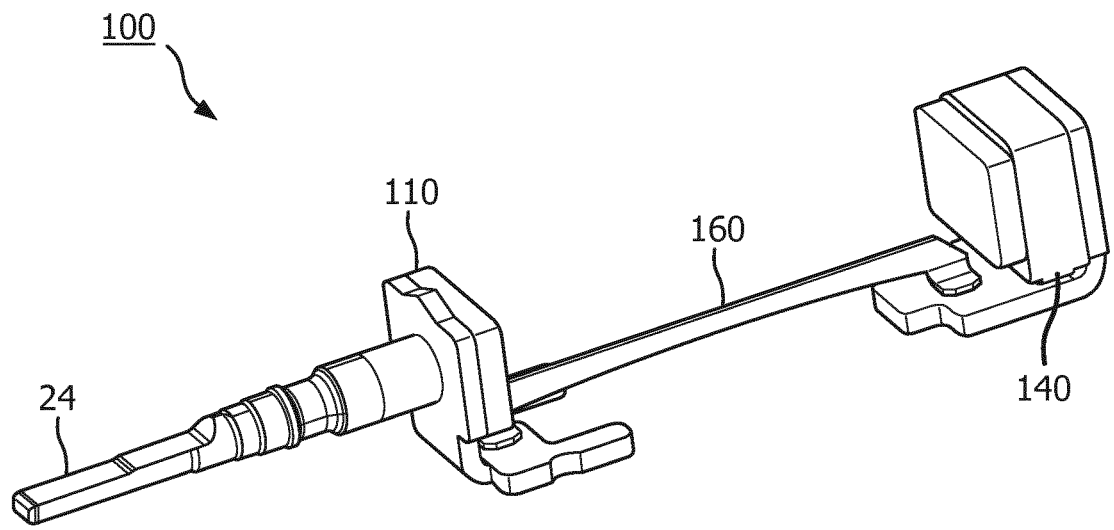
FIG. 4 is a schematic representation of a portion of a drivetrain assembly of a personal care device, in accordance with an embodiment.

Referring to FIG. 4, in one embodiment, is a portion of a drivetrain assembly 100 of a personal care device. The drivetrain assembly comprises a load mass 110, from which extends a drivetrain transmission shaft 24 to drive a brush head member 14. The drivetrain assembly also comprises a balance mass 140. The load mass 110 and the balance mass 140 are connected by a coupling spring 160. Coupling spring 160 and any of the other springs of the system can be, for example, a tension spring, a torsion spring, a compression spring, a leaf spring, a V-shaped spring, a U-shaped spring, or any of a variety of different spring shapes, types, and sizes.

Figure 5:
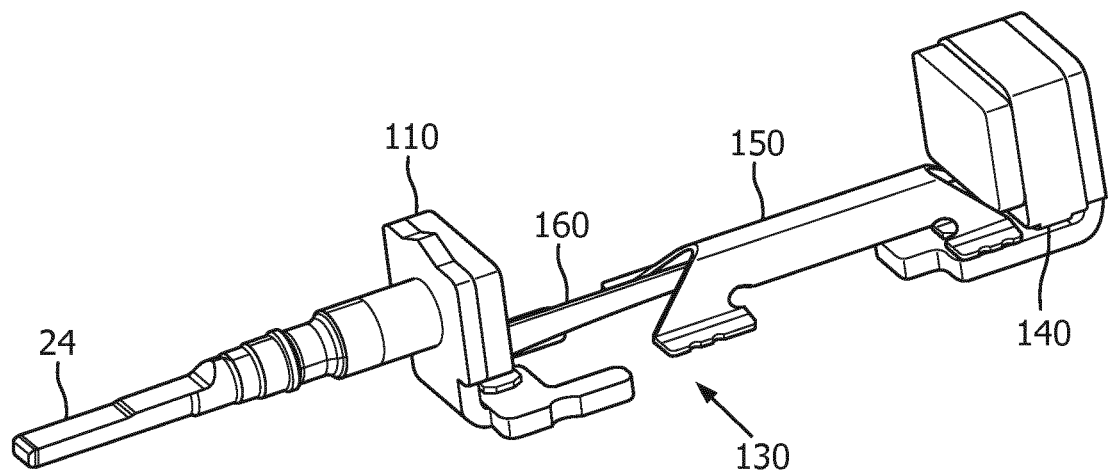
FIG. 5 is a schematic representation of a portion of a drivetrain assembly of a personal care device, in accordance with an embodiment.

Referring to FIG. 5, in one embodiment, is the drivetrain assembly 100 of FIG. 4, with a second spring member 150 added between balance mass 140 and a fixed point 130 which is a portion of the frame or housing of the device, or fixedly connected to a portion of the frame or housing of the device.

Figure 6:
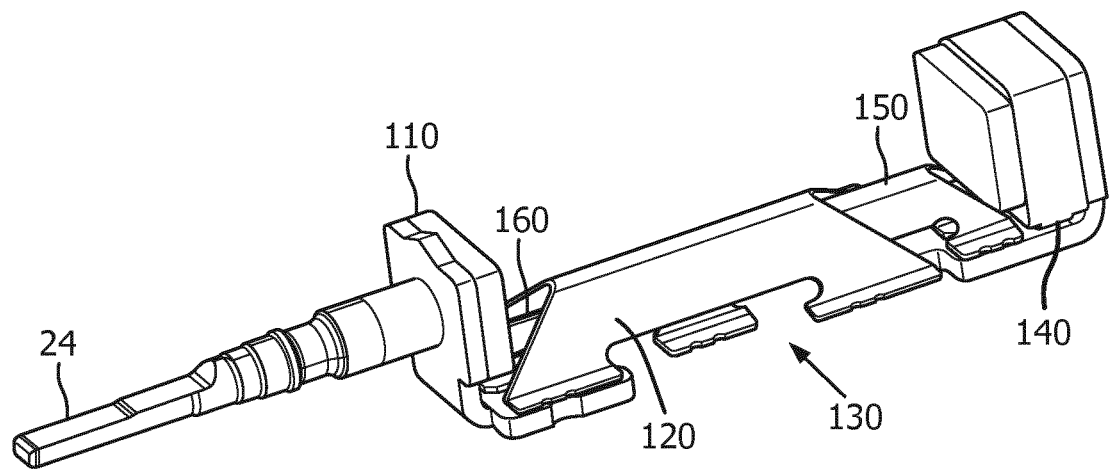
FIG. 6 is a schematic representation of a portion of a drivetrain assembly of a personal care device, in accordance with an embodiment.

Referring to FIG. 6, in one embodiment is the drivetrain assembly 100 of FIG. 5, with a first spring member 120 added between primary resonator 110 and a fixed point 130, which is a portion of the frame or housing of the device, or fixedly connected to a portion of the frame or housing of the device. The system now comprises three springs, the first spring is spring 120 between the primary resonator 110 and the fixed point 130. The second spring is spring 150 between the secondary resonator 140 and the fixed point 130. The third spring being coupling spring 160 connected between primary resonator 110 and secondary resonator 140. Although the three springs are shown with a specific arrangement in FIGS. 4-6, the springs can take many different configurations or arrangements. For example, the spacing and relationships between the springs can be altered without altering the functioning of the system. Furthermore, the size and location of the fixed point 130 can vary. As just one example, each of springs 120 and 150 can be connected at one end to different fixed points 130 (not shown), with spring 120 connected to a first fixed point 130a, and spring 150 connected to a second fixed point 130b. Many other variations are possible.

Figure 7:
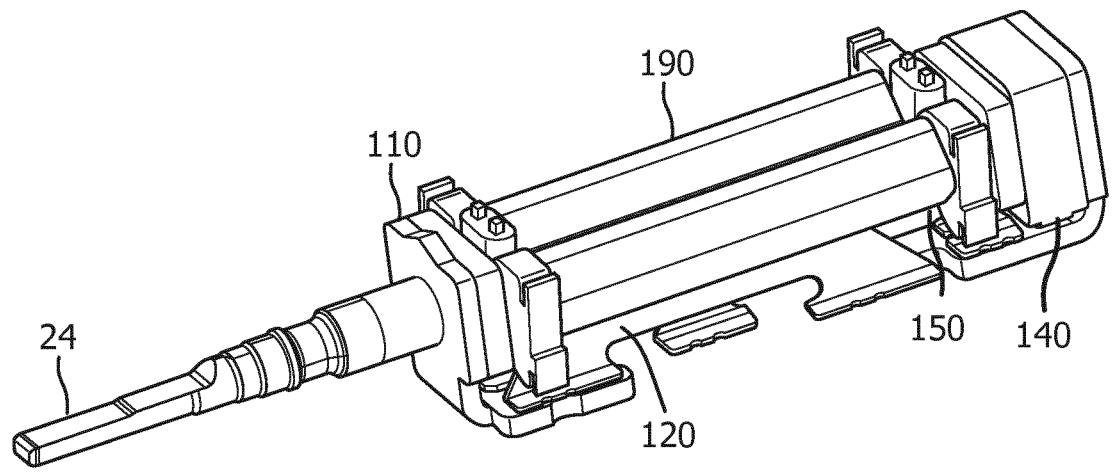
FIG. 7 is a schematic representation of an assembled drivetrain assembly of a personal care device, in accordance with an embodiment.

Referring to FIG. 7, in one embodiment is the drivetrain assembly 100 of FIG. 6, with an actuator 190 configured to exert rotational force on both the primary resonator or load mass 110 and the secondary resonator or balance bass 140. Actuator 190 in FIG. 7 exerts a rotational force on the resonators in this embodiment, but many other embodiments are possible. For example, the actuator 190 may exert a translational force rather than or in additional to a rotational force. As yet another example, the actuator 190 may exert a force on just the load mass 110, or just the balance mass 140. Many other variations and embodiments are possible.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A drivetrain assembly for a personal care device, the drivetrain assembly comprising:
    a primary resonator connected to a transmission component drivetrain shaft configured to transmit vibrations generated by the drive train assembly to a brush head member;
    a secondary resonator configured to reduce vibrations transmitted from the drive train assembly to a body portion of the personal care device;
    at least one fixed point positioned between the primary resonator and the secondary resonator;

a first spring member connected at a first end to the primary resonator and at a second end to one of the at least one fixed points;

a second spring member connected at a first end to the secondary resonator and at a second end to one of the at least one fixed points;

a coupling spring connected at a first end to the primary resonator and at a second end to the secondary resonator; and an actuator configured to exert force on at least one of the primary resonator and the secondary resonator.

2. The drivetrain assembly of claim 1, wherein the at least one fixed point is fixed to the body portion of the personal care device.

3. The drivetrain assembly of claim 1, wherein the force exerted by the actuator is a rotational force exerted on at least one of the primary resonator and the secondary resonator.

4. The drivetrain assembly of claim 1, wherein the force exerted by the actuator is a translational force exerted on at least one of the primary resonator and the secondary resonator.

5. The drivetrain assembly of claim 1, wherein the actuator is configured to exert a first force on the primary resonator approximately 180° out of phase with a second force exerted on the secondary resonator.

6. The drivetrain assembly of claim 1, wherein the first spring member, the second spring member, and the coupling spring are V-shaped springs.

7. The drivetrain assembly of claim 6, wherein the coupling spring is at least partially positioned within either the V-shaped first spring member or the V-shaped second spring member.

8. A personal care device comprising:

a body portion;

a brush head member; and a drivetrain assembly, the drivetrain assembly comprising a primary resonator, the primary resonator connected to a transmission component drivetrain shaft configured to transmit vibrations generated by the drive train assembly to the brush head member; a secondary resonator, the secondary resonator configured to reduce vibrations transmitted from the drive train assembly to the body portion; at least one fixed point positioned between the primary resonator and the secondary resonator; a first spring member connected at a first end to the primary resonator and at a second end to one of the at least one fixed points; a second spring member connected at a first end to the secondary resonator and at a second end to one of the at least one fixed points; a coupling spring connected at a first end to the primary resonator and at a second end to the secondary resonator; and an actuator configured to exert force on at least one of the primary resonator and the secondary resonator.

9. The personal care device of claim 8, wherein the actuator is configured to exert a first force on the primary resonator approximately 180° out of phase with a second force exerted on the secondary resonator.

10. The personal care device of claim 8, wherein the first spring member, the second spring member, and the coupling spring are V-shaped springs.

11. The personal care device of claim 10, wherein the coupling spring is at least partially positioned within either the V-shaped first spring member or the V-shaped second spring member.

* * * * *